US012678372B2

(12) United States Patent
Park et al.

(10) Patent No.: US 12,678,372 B2
(45) Date of Patent: Jul. 14, 2026

(54) MULTI-VIAL ADAPTER

(71) Applicant: STS BIO Co., Ltd., Incheon (KR)

(72) Inventors: Jung Gun Park, Gyeonggi-do (KR); Man Jin Bang, Gyeonggi-do (KR); Jae Hoon Heo, Gyeonggi-do (KR)

(73) Assignee: STS BIO Co., Ltd., Incheon (KR)

( * ) Notice: Subject to any disclaimer, the term of this patent is extended or adjusted under 35 U.S.C. 154(b) by 317 days.

(21) Appl. No.: 18/289,660

(22) PCT Filed: Nov. 8, 2022

(86) PCT No.: PCT/KR2022/017456

§ 371 (c)(1),
(2) Date: Nov. 6, 2023

(87) PCT Pub. No.: WO2023/096219

PCT Pub. Date: Jun. 1, 2023

(65) Prior Publication Data

US 2024/0252400 A1 Aug. 1, 2024

(30) Foreign Application Priority Data

Nov. 29, 2021 (KR) ........................ 10-2021-0166750

(51) Int. Cl.
*A61J 1/20* (2006.01)

(52) U.S. Cl.
CPC ........... *A61J 1/2089* (2013.01); *A61J 1/2013* (2015.05); *A61J 1/2055* (2015.05); *A61J 1/2096* (2013.01)

(58) Field of Classification Search
CPC ........ A61J 1/201; A61J 1/2096; A61J 1/2013; A61J 1/2082; A61J 1/2089; A61J 1/2075; A61J 1/2068; A61J 1/2058; A61J 1/2065
See application file for complete search history.

(56) References Cited

U.S. PATENT DOCUMENTS

2012/0053555 A1* 3/2012 Ariagno ................ A61J 1/2089 604/416
2014/0020793 A1* 1/2014 Denenburg ........... A61J 1/2089 141/329

(Continued)

FOREIGN PATENT DOCUMENTS

KR 10-2214772 B1 2/2021
KR 10-2309016 B1 10/2021

(Continued)

OTHER PUBLICATIONS

International Search Report for PCT/KR2022/017456 mailed on Feb. 22, 2023.

*Primary Examiner* — Philip R Wiest
*Assistant Examiner* — Seth Han
(74) *Attorney, Agent, or Firm* — The PL Law Group, PLLC

(57) ABSTRACT

A multi-vial adapter includes an adapter body including at least two body parts, which are connected to each other at a certain angle, a head part, which protrudes upward from a connection portion between the body parts, and at least two spike parts, which extend downward from the body parts, respectively, at positions spaced a certain distance from the connection portion, and at least two adapter caps which are physically fastened and fixed to the body parts, respectively, and through which the spike parts respectively pass. The adapter body is formed by an injection molding process such that the head part, the body parts, and the spike parts are integrated with each other, and a liquid drug flow path that guides the movement of a liquid drug from the respective spike parts to the head part via the respective body parts may be formed inside the adapter body.

4 Claims, 9 Drawing Sheets

(56) References Cited

U.S. PATENT DOCUMENTS

| | | | | |
|---|---|---|---|---|
| 2015/0117140 | A1* | 4/2015 | Asada | B01F 35/7174<br>366/176.3 |
| 2020/0276084 | A1* | 9/2020 | Denenburg | A61J 1/2089 |
| 2022/0133594 | A1* | 5/2022 | Korogi | A61J 1/2082<br>604/416 |
| 2024/0108548 | A1* | 4/2024 | Mosler | A61J 1/2055 |

FOREIGN PATENT DOCUMENTS

| | | | |
|---|---|---|---|
| KR | 10-2423037 | B1 | 7/2022 |
| WO | WO 2014/122643 | A1 | 8/2014 |
| WO | WO 2014/191950 | A1 | 12/2014 |
| WO | WO 2015/069649 | A1 | 5/2015 |

* cited by examiner

MULTI-VIAL ADAPTER

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/017456 filed on Nov. 8, 2022, which claims priority to the benefit of Korean Patent Application No. 10-2021-0166750 filed in the Korean Intellectual Property Office on Nov. 29, 2021, the entire contents of which are incorporated herein by reference.

BACKGROUND

1. Technical Field

The present invention relates to a multi-vial adapter which may safely and rapidly extract a liquid drug from a plurality of vials and which is easily manufactured.

2. Background Art

A vial, which is a medicine bottle or a liquid drug storage container in which a liquid drug is stored in a sterile state, typically has a structure in which an inlet of an upper end thereof is sealed with a rubber stopper after the liquid drug is sterilized while being stored therein and is configured such that the liquid drug may be safely stored and transported.

The liquid drug stored in the vial is typically dispensed by extracting with a liquid drug extraction device such as a syringe.

However, when the liquid drug is extracted from the vial and is dispensed, it is difficult to insert an injection needle into the vial in the related art, and there is a risk of being stabbed by an injection needle and injured or being infected with the liquid drug even with little carelessness during the process, and the liquid drug may be extracted from only one vial, so that it is cumbersome and takes a lot of time to extract the liquid drug.

Therefore, the present applicant proposes a multi-vial connector which may safely and rapidly extract a liquid drug from a plurality of vials. However, it was found that the conventional proposed technology has an innovative advantage of safely and rapidly extracting the liquid drug from the plurality of vials, but has disadvantages in that manufacturing thereof is not easy due to its structure, a work process is complicated because it undergoes a bonding process for screw-coupling and fixing of a vial cap to a main body, and the like.

SUMMARY

The present invention is proposed to solve the above-described conventional problems, and an object of the present invention is to provide a multi-vial adapter that may simultaneously and rapidly extract a liquid drug from a plurality of vials and has significantly improved productivity due to a structure that is also easy to manufacture.

As a technical solution of the present invention for achieving the above object, disclosed is a multi-vial adapter including: an adapter body including at least two body parts which are connected to each other at a certain angle, a head part which protrudes upward from a connection portion between the body parts, and at least two spike parts which extend downward from the body parts, respectively, at positions spaced apart from the connection portion at a predetermined distance; and at least two adapter caps which are physically fastened and fixed to the body parts, respectively, while allowing the spike parts to pass therethrough, respectively, wherein the adapter body is configured such that the body parts, the head part, and the spike parts are integrally formed through injection molding, and is formed therein with a liquid drug flow path that guides movement of a liquid drug from the respective spike parts to the head part via the respective body parts.

According to the present invention, the multi-vial adapter may simultaneously and rapidly extract the liquid drug from the plurality of vials and have significantly improved productivity due to a structure that is easy to manufacture.

DETAILED DESCRIPTION

Figure 1:
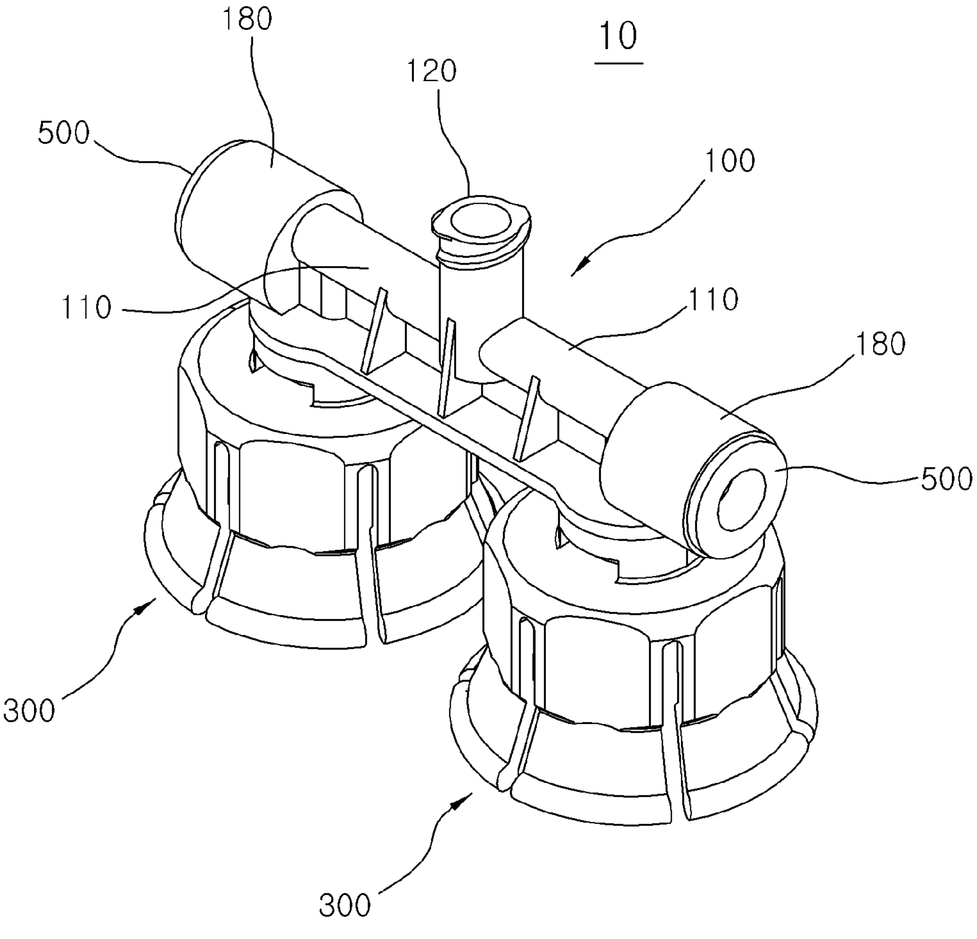
FIG. 1 is a view illustrating a multi-vial adapter according to one embodiment of the present invention.
Figure 2:
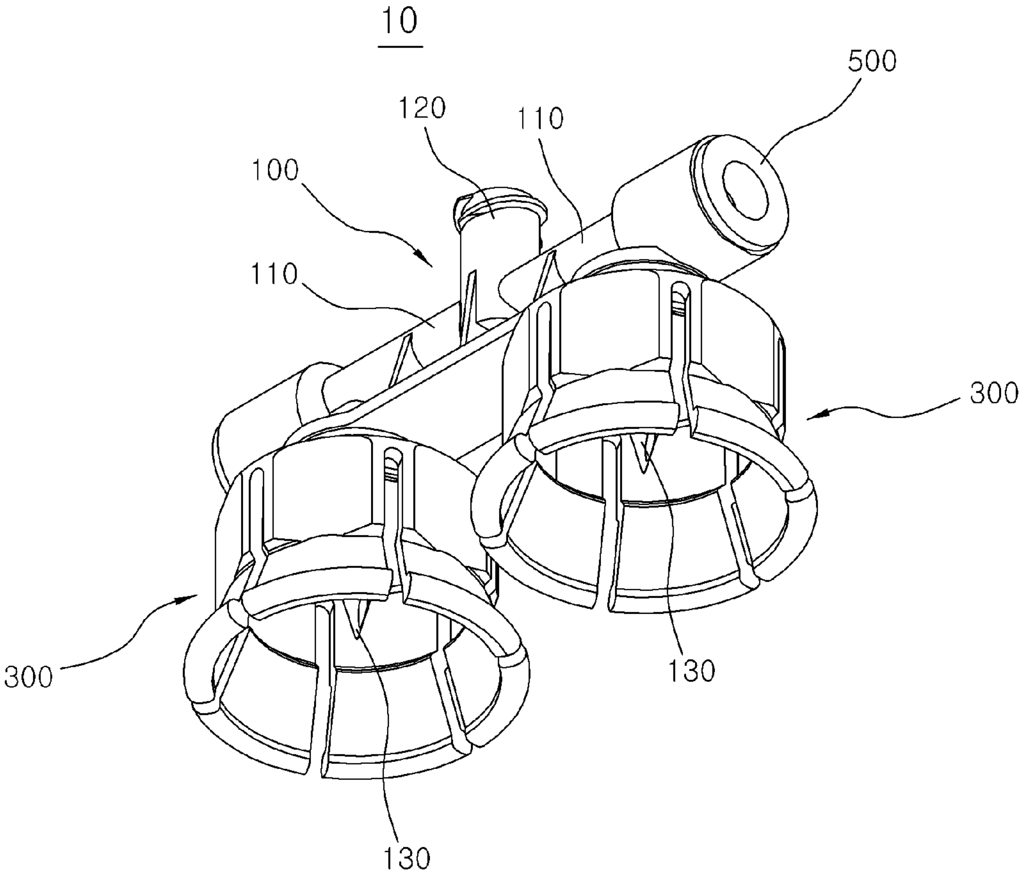
FIG. 2 is a bottom view illustrating a multi-vial adapter according to one embodiment of the present invention, when viewed from a bottom.

Hereinafter, preferred embodiments of a multi-vial adapter according to the present invention will be described in detail with reference to accompanying drawings.

In the accompanying drawings, the shape, the size, the number of elements, the intervals between elements, and the like may be reduced or exaggerated to emphasize a clearer description and are not limited to those illustrated in the drawings unless specifically limited.

Further, it should be understood that terms indicating directions such as front, rear, left, right, upper, lower, and the like are used only to describe the directions shown and observed in the drawings, and such terms may also be changed when the directions shown and observed are changed.

FIGS. 1 to 8 illustrate a multi-vial adapter 10 according to one embodiment of the present invention.

As illustrated in FIGS. 1 to 8, the multi-vial adapter 10 according to one embodiment of the present invention may largely include an adapter body 100 and an adapter cap 300.

First, the adapter body 100 may basically include a body part 110, a head part 120, and a spike part 130.

A plurality of at least two or more body parts 110 may be provided, and the plurality of body parts 110 may be connected to each other at a predetermined angle.

For example, two body parts 110 may be provided, and in this case, the two body parts 110 may be connected to each other at 180°. That is, the two body parts may be linearly connected to each other.

In addition, three body parts 110 may be provided, and in this case, the three body parts 110 may be connected to each other at 120°, and when four body parts 110 may be provided, the four body parts 110 may be connected to each other at 90°.

FIGS. 1 to 8 illustrate a configuration in which two body parts 110 are provided and connected to each other at intervals of 180°, that is, in a line.

The head part 120 may protrude upward from a connection portion between the plurality of body parts 110.

That is, as illustrated in FIGS. 1 to 8, when two body parts 110 are linearly connected, the head part 120 may protrude vertically upward at a predetermined length from the connection portion between the two body parts 110, that is, at a middle position of left and right body parts 110 that are linearly connected.

The number of spike parts 130 corresponding to the number of body parts 110, that is, a plurality of spike parts 130 may be provided. For example, two spike parts 130 may be provided when two body parts 110 are provided, three spike parts 130 may be provided when three body parts 110 are provided, and four spike parts 130 may be provided when four body parts 110 are provided.

The spike parts 130 may extend downward from the body parts 110, respectively, at positions spaced apart from the connection portion between the plurality of body parts 110 at a predetermined distance.

The spike part 130 may have a shape in which an outer diameter thereof gradually decreases as it goes downward from one portion at a lower side and an end portion thereof is sharp.

The adapter body 100 having the above configuration may be configured such that the body parts 110, the head part 120, and the spike parts 130 are integrally formed through injection molding.

The adapter body 100, in which the body parts 110, the head part 120, and the spike parts 130 are integrally formed, may be formed therein with a liquid drug flow path for guiding movement of a liquid drug.

Figure 4:
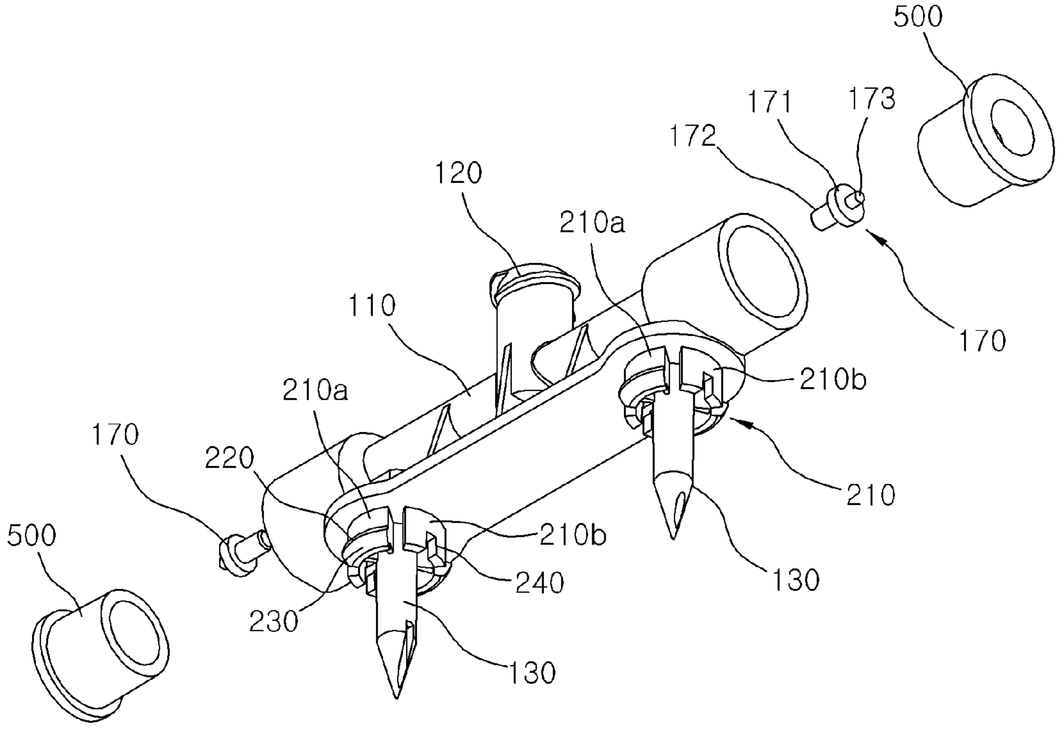
FIG. 4 is a view illustrating the adapter body by disassembling a channel closer and a filter member.
Figure 5:
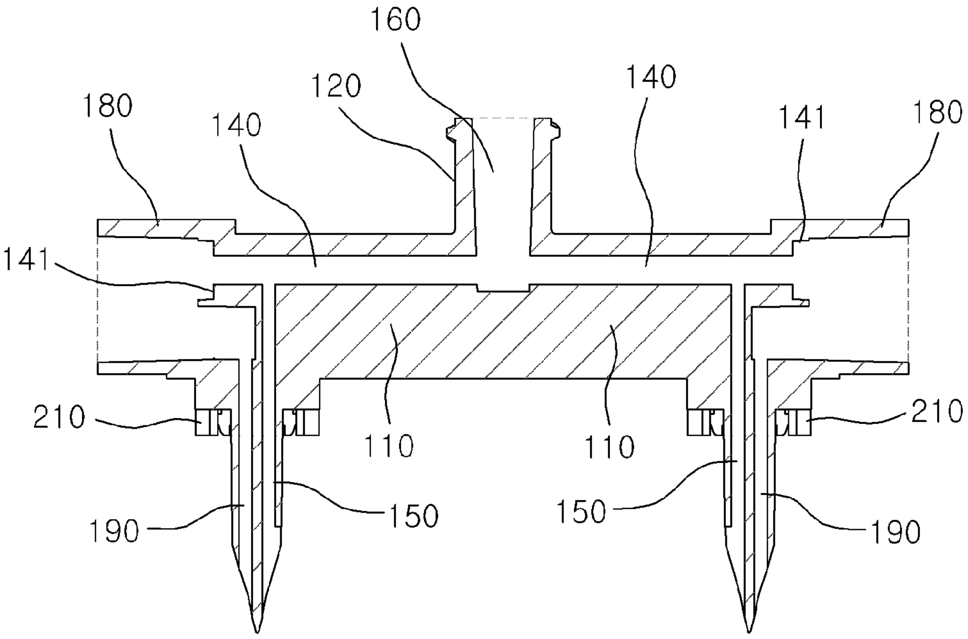
FIG. 5 is a sectional view of the adapter body in a state in which the channel closure and the filter member are installed.
Figure 6:
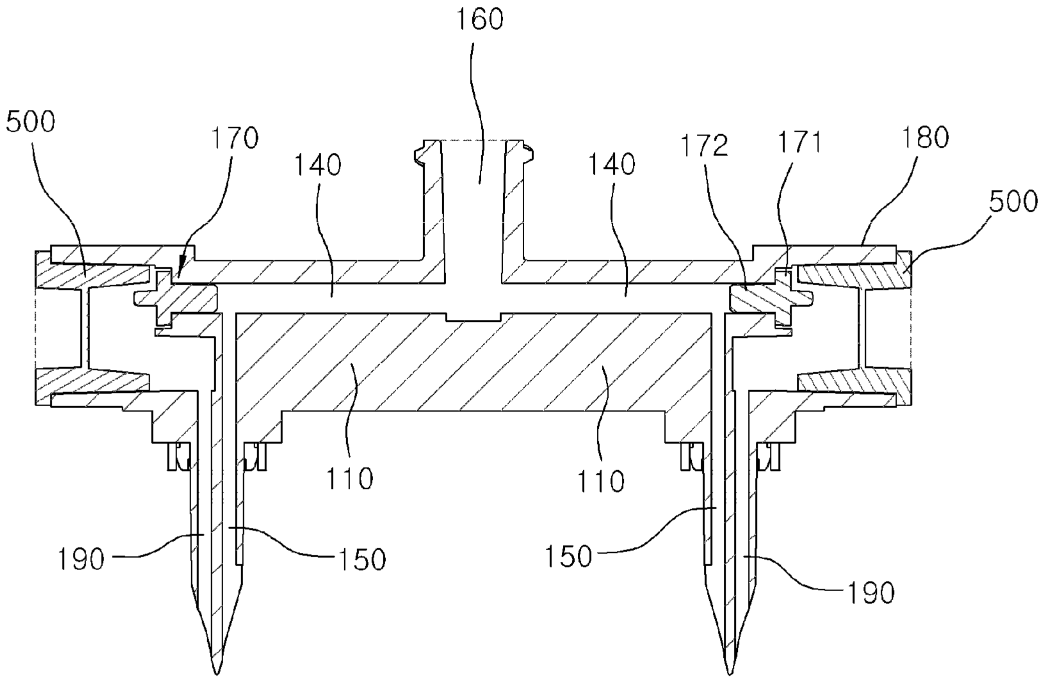
FIG. 6 is a sectional view of the adapter body in the state in which the channel closure and the filter member are installed.

The liquid drug flow path serves as a flow path that is formed along an inside of the adapter body 100 to guide movement of the liquid drug, and may include via channels 140, an inflow channel 150, an outflow channel 160, and a channel closure 170 as illustrated in FIGS. 4 to 6.

The via channels 140 may be formed inside the body parts 110, respectively, so that a plurality of at least two or more via channels 140 may be provided.

The via channel 140 may extend along a longitudinal direction of each of the body parts 110 and may have one ends connected to each other and opposite ends that are open.

For example, when two body parts 110 are provided, the via channel 140 may have a structure in which the via channels 140 are linearly connected to each other while extending along the inside of the two body parts 110, respectively, and opposite end portions are open.

The via channel 140 has a structure in which the respective end portions are open as the via channels 140 are connected to each other, so that when the adapter body 100 is integrally manufactured through injection molding, the via channel 140 may be easily formed inside the body part 110.

The inflow channel 150 may be formed in each of the spike parts 130 and may have an open lower end and an upper end communicating with the via channel 140 while extending along the inside of each of the plurality of spike parts 130.

That is, the inflow channel 150 may extend along a vertical direction from the inside of each of the plurality of spike parts 130, in which the lower end thereof may have an open structure such that the liquid drug may be introduced from the vial, and the upper end may communicate with each of the via channels 140 such that the introduced liquid drug enters the via channels 140.

The outflow channel 160 may be formed inside the head part 120 and may have an open upper end and a lower end communicating with the via channel 140 while extending along the inside of the head part 120.

That is, the outflow channel 160 may extend along the vertical direction from the inside of the head part 120, in which the lower end thereof may communicate with a connection portion between the via channels 140 such that the liquid drug guided along the via channel 140 may enter, and the upper end thereof has an open structure such that the liquid drug may flow out to a liquid drug extraction device.

In this case, as described above, the end portion of the via channel 140 formed in each of the plurality of body parts 110 has an open structure, and the lower end of the inflow channel 150 formed in the spike part 130 and the upper end of the outflow channel 160 formed in the head part 120 are configured to communicate with each other with the open structures, respectively, so that when the adapter body 100 is manufactured integrally, the via channel 140 inside the body part 110, the inflow channel 150 inside the spike part 130, and the outflow channel 160 inside the head part 120 may be easily formed by injection molding.

That is, an insert member for forming the respective channels 140, 150, and 160 may be installed inside an injection mold for injection molding, and the insert member may be removed from the adapter body 100 by drawing out the same after injection molding, thereby easily manufacturing the adapter body 100 formed in each of the channels 140, 150, and 160.

The channel closure 170 is fixedly coupled to the open opposite end of the via channel 140 to close the open end portion of the via channel 140, thereby forming a closed path extending from the open lower end of the inflow channel 150 to the open upper end of the outflow channel 180.

As described above, in order to easily manufacture the adapter body 100 through injection molding, since the end portion of the via channel 140 has an open structure, the channel closure 170 closes the open end portion of the via channel 140, thereby forming a movement path through which the liquid drug may move from the inflow channel 150 to the outflow channel 160 via the via channel 140 without leakage.

The channel closure 170 may be manufactured through injection molding independently of the adapter body 100 and may be fixedly coupled to the open end portion of the via channel 140 through ultrasonic fusion.

In this case, in order to stably, airtightly, and fixedly install the channel closure 170, the via channel 140 may be formed on the open end portion with a mounting step 141 having an inner diameter that is relatively larger than an inner diameter of the via channel 140, and the channel closure 170 may include an airtight body 171, an insertion head 172, and a support piece 173.

The airtight body 171 may have a diameter corresponding to the inner diameter of the mounting step 141 so as to be inserted into and mounted on the mounting step 141, and the insertion head 172 may be formed on a front surface of the airtight body 171 and may have a diameter corresponding to the inner diameter of the via channel 140 so as to enter an inside of the via channel 140 at a predetermined depth.

The support piece 173 may protrude from a rear surface of the airtight body 171 at a predetermined length such that the airtight body 171 may be easily gripped when the channel closure 170 is installed.

The channel closure 170 having such a configuration is installed so as to airtightly make close contact with the end portion of the via channel 140 as the insertion head 172 enters the inside of the via channel 140 and the airtight body 171 is mounted on the mounting step 141 in a state in which the support piece 173 is gripped by a support unit, and is firmly fixed through ultrasonic fusion.

Meanwhile, the adapter body 100 having the above configuration may be further formed with an end pipe 180 and a ventilation channel 190 for circulating air.

The end pipe 180 may be integrally formed on each of the end portions of the body part 110, and may be formed in a pipe shape in which a diameter thereof is expanded from the open end portion of the via channel 140 formed in the body part 110 and extends at a predetermined length and an end portion thereof is open.

That is, the end pipe 180 has a pipe shape having a diameter that is relatively larger than a diameter of the via channel 140, and has a structure in which a portion of an inner end portion thereof communicates with the via channel 140 (obviously, does not communicate with the via channel 140 when the channel closure 170 is fixedly coupled to the via channel 140) and the entire portion of an outer end portion thereof is open.

The ventilation channel 190 may be formed in each of the spike parts 130 and may have an open lower end and an upper end communicating with the end pipe 180.

That is, the ventilation channel 190 may be formed in each of the spike parts 130 to extend in the vertical direction in parallel with the inflow channel 150, and may have a lower end that is open such that air may enter and an upper end communicating with the end pipe 180.

In this case, since the end pipe 180 has a structure that extends while communicating with the via channel 140 and the ventilation channel 190 has a structure in which the upper end thereof communicates with the end pipe 180 like the inflow channel 150, the end pipe 180 and the ventilation channel 190 may be also easily formed by injection molding when the adapter body 100 is integrally formed.

The end pipe 180 and the ventilation channel 190 may be provided for circulating air, and thus a filter member 500 capable of filtering contaminants in the air may be installed inside the end pipe 180.

The filter member 500 may be firmly fixed to the end pipe 180 through ultrasonic fusion after being inserted into the end pipe 180.

In this case, the filter member 500 is fixed to the end pipe 180 connected to the via channel 140 as described above, so that the via channel 140 is primarily closed by the channel closure 170 and is additionally closed by the filter member 500, thereby further minimizing the possibility of leakage of the liquid drug passing through the via channel 140.

Next, the adapter cap 300 may be fixedly coupled to the adapter body 100 and may serve to couple the adapter body 100 to the vial when the spike part 130 is inserted into the vial.

The adapter cap 300 may have a substantially cylindrical shape with an open lower portion and may have a structure in which a side surface thereof is formed with a plurality of cut slits 310 at predetermined distances and a center of an upper end thereof is formed with a through-hole 320 for allowing the spike part 130 to pass therethrough.

A plurality of at least two or more adapter caps 300 may be provided corresponding to the number of spike parts 130.

In addition, the adapter cap 300 may be transparently formed such that the spike part 130 of the adapter body 100, which passes through the inside thereof, may be seen from an outside.

The adapter cap 300 is separately manufactured through injection molding while being separated from the adapter body 100, and is then fixed by being physically fastened and coupled to the adapter body 100.

Figure 3:
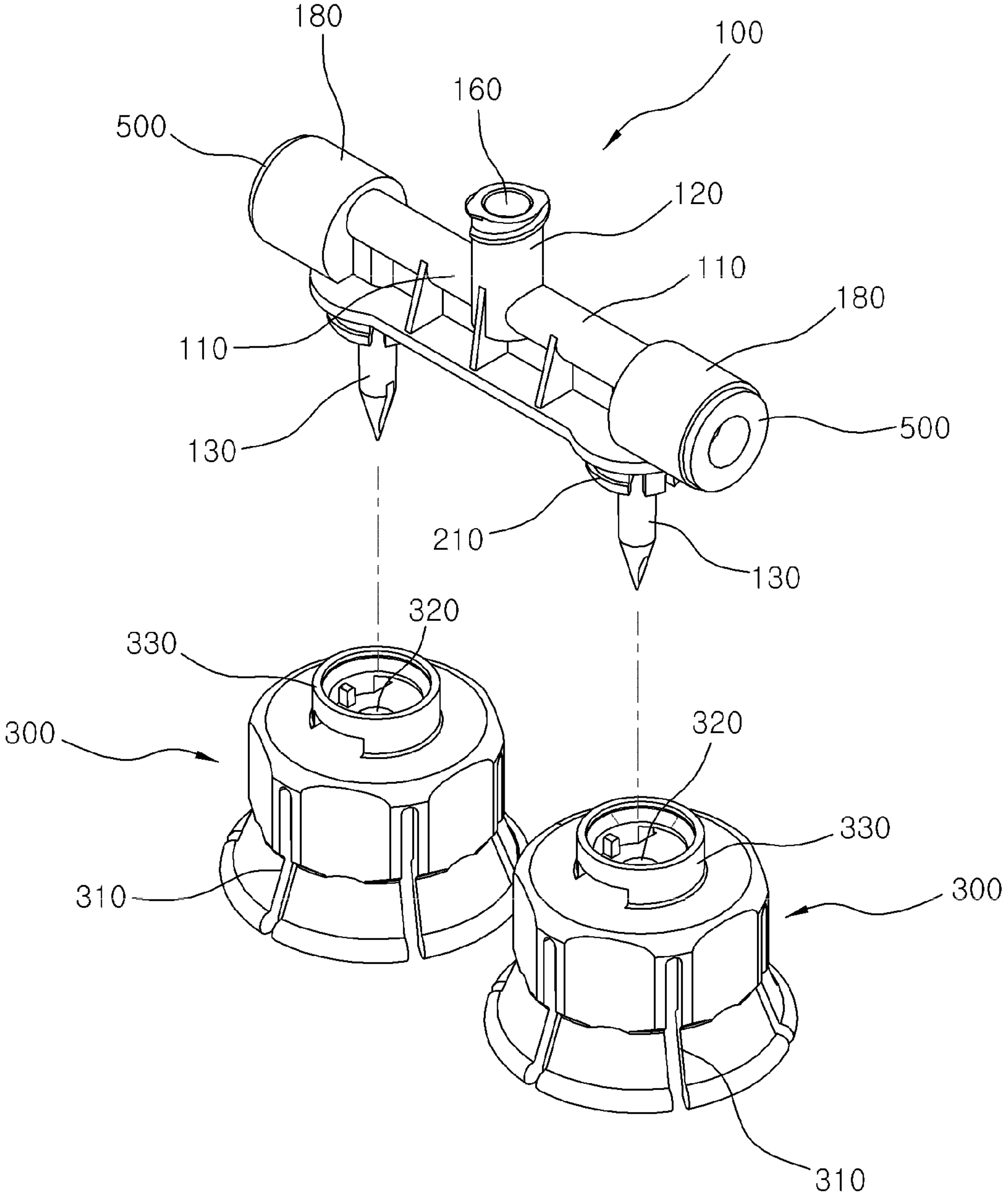
FIG. 3 is a view illustrating a state in which an adapter body is separated from an adapter cap.

In order to physically couple the adapter cap 300 to the adapter body 100, as illustrated in FIG. 3, the adapter body 100 may be formed with a docking body 210 on a bottom surface of the body part 110, and correspondingly, an upper end of the adapter cap 300 may be formed with a connection pipe 330 into which the docking body 210 is fixedly inserted.

The docking body 210 may be formed around the spike part 110 in an annular shape.

Figure 7:
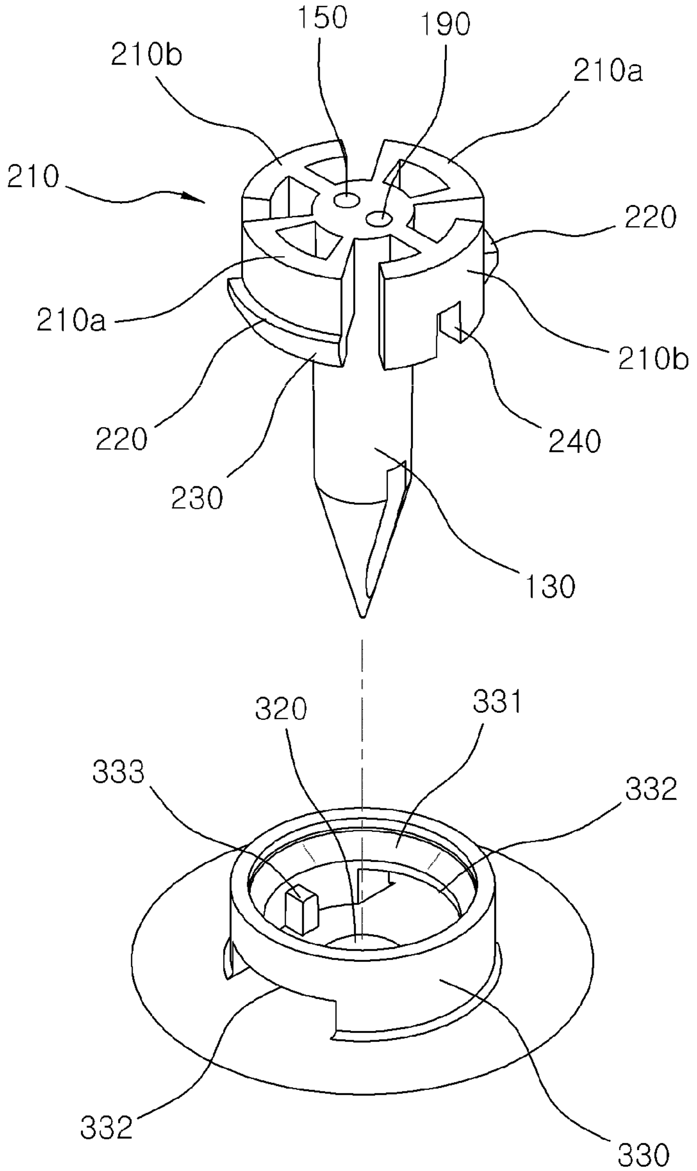
FIG. 7 is a view illustrating a component for physically and fixedly coupling between the adapter body and an adapter cap.

As illustrated in FIG. 7, the docking body 210 may include four docking segments 210*a* and 210*b* divided radially at 90-degree intervals about the spike part 110, in which a pair of docking segments 210*a* facing each other are formed with a latch protrusion 220 and an inward slope part 230, and the remaining pair of docking bodies 210*b* facing each other may be formed therein with a fitting groove 240.

The connection pipe 330 may be formed in the upper end of the adapter cap 300 and may annually protrude around the through-hole 320.

An inner circumferential surface of the connection pipe 330 is formed with a protrusion slope part 331 protruding obliquely toward a center, and a pair of latch openings 332 are formed at a lower side of the protrusion slope part at positions facing each other corresponding to the latch protrusion 220 formed on the pair of docking segments 210*a*.

Further, a pair of fitting protrusions 333 may be formed inside the connection pipe 330 at positions facing each other corresponding to the fitting groove 240 formed in the pair of docking segments 210*b*.

Figure 8:
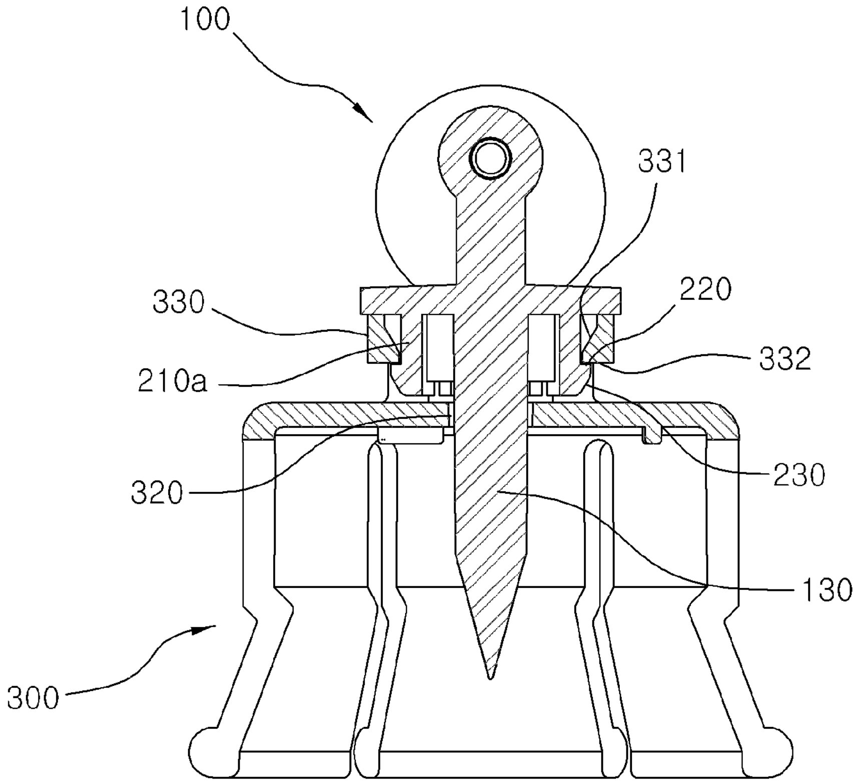
FIG. 8 is a sectional view illustrating a state in which the adapter body is physically and fixedly coupled to the adapter cap.

According to the above configuration, as illustrated in FIG. 8, when the docking body 210 is fitted into the connection pipe 330 after the spike part 130 passes through the through-hole 320 of the adapter cap 300, the pair of docking segments 210*a* are elastically contracted by the inward slope part 230 so that the latch protrusion 220 passes through the protrusion slope part 331 downward, and then the latch protrusion 220 is supported while being latched to an upper end of the latch opening 332 as the pair of docking segments 210*a* are elastically restored, and thus the adapter cap 300 is hardly separated from the adapter body 100, that is, is irreversibly fastened and fixed to the adapter body 100.

In this case, the pair of fitting protrusions 333 in the connection pipe 330 are fitted into the fitting groove 240 formed in the pair of docking segments 210*b*, thereby further enhancing a fixing force.

The adapter cap 300 may be rapidly and firmly fixed to the adapter body 100 without a cumbersome bonding work through a physical fastening method such as insertion and latching between the connection pipe 330 and the docking body 210 as described above.

A method for manufacturing the multi-vial adapter according to the present invention configured as described above will be described as follows.

First, an injection mold for molding each of the adapter body 100, the channel closure 170, and the adapter cap 300 is manufactured to independently mold each of the adapter body 100, the channel closure 170, and the adapter cap 300 through an injection molding process.

In this case, particularly, the adapter body 100 is injection molded by designing and manufacturing an injection mold such that the body parts 110, the head part 120, the spike parts 130, and the docking body 210 are integrally formed and by disposing insert members for forming the via channel 140, the inflow channel 150, the outflow channel 160, the end pipe 180, and the ventilation channel 190 inside the injection mold.

In this case, the adapter body 100, the channel closure 170, and the adapter cap 300 may be manufactured by injection molding a synthetic resin, in which the adapter body 100 and the channel closure 170 may be manufactured using an acrylonitrile butadiene styrene copolymer (ABS) resin and the adapter cap 300 may be manufactured using a polycarbonate (PC) resin.

When the adapter body 100, the channel closure 170, and the adapter cap 300 are formed through injection molding as described above, the channel closure 170 is fixedly coupled to the end portion of the via channel 140 inside the adapter body 100.

That is, the channel closure 170 is inserted into the body part 110 through the end pipe 180 so that the insertion head 172 is inserted into the via channel 140 at a predetermined depth and the airtight body 171 is mounted on the mounting step 141, and the channel closure 170 is then fixed to the open end portion of the via channel 140 through an ultrasonic fusion process.

When the channel closure 170 is fixed as described above, the open end portion of the via channel 140 is closed, thereby forming a liquid drug flow path in the adapter body 100 to guide the movement of the liquid drug.

When the liquid drug flow path is formed as described above, the filter member 500 is inserted into the end pipe 180, and the filter member 500 is then firmly fixed to the end pipe 180 through the ultrasonic fusion process.

Through the above process, the adapter body 100 having the liquid drug movement and ventilation structure is completely manufactured, and the adapter cap 300 is then fixedly coupled to the adapter body 100.

That is, after the spike part 130 of the adapter body 100 passes through the through-hole 320 of the adapter cap 300, a coupling work is performed such that the docking body 210 of the adapter body 100 is inserted into the connection pipe 330 of the adapter cap 300.

The latch protrusion 220 of the docking body 210 is then elastically latched to the latch opening 332 of the connection pipe 330 to provide a physical fixing force, thereby rapidly and simply completing the coupling and fixing work of the adapter cap 300.

The multi-vial adapter 10 of the present invention manufactured through the above-described method may be used to rapidly and simultaneously extract the liquid drug from at least two vials 20 when the liquid drug is extracted from the vials.

Figure 9:
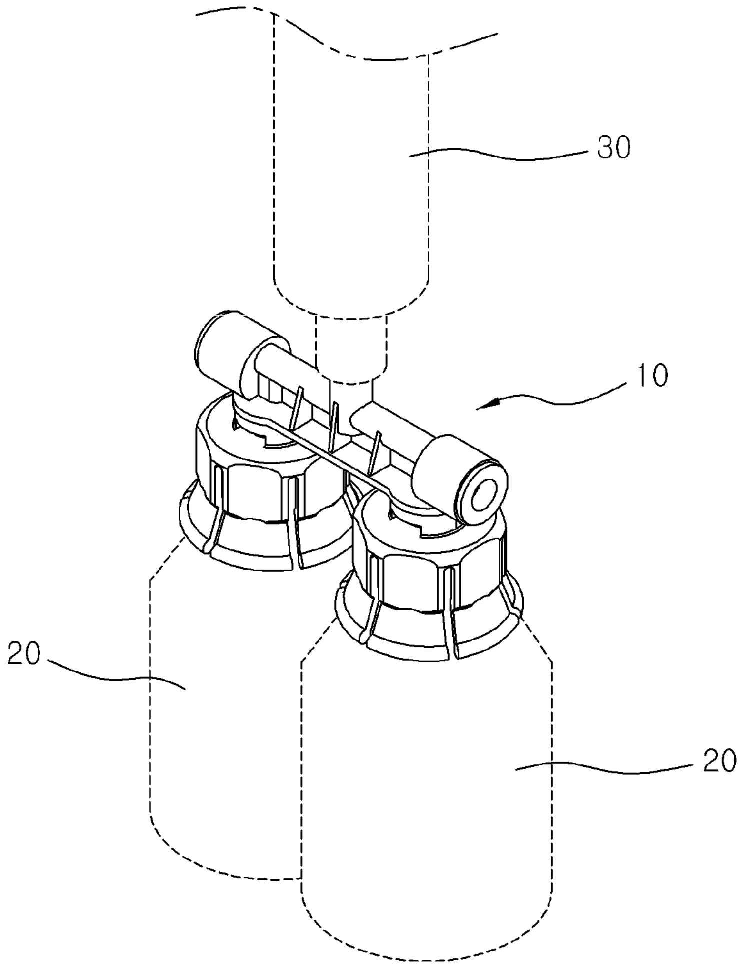
FIG. 9 is a view illustrating an example of use of the multi-vial adapter according to one embodiment of the present invention.

For example, as illustrated in FIG. 9, when two body parts 110 are provided, a liquid drug extraction device 30 may be connected to the head part 120 of the adapter body 100, and two vials 20 may be coupled to the adapter body 100 using two spike parts 130 and two adapter caps 300, and when coupled in this way, the liquid drug may be simultaneously extracted from the two vials 20 through the liquid drug flow path formed inside the adapter body 100.

Obviously, when three body parts 110 are provided, the liquid drug may be simultaneously extracted by coupling three vials thereto, and when four body parts 110 are provided, the liquid drug may be simultaneously extracted by coupling four vials thereto.

As described above, the multi-vial adapter according to the present invention may be easily manufactured, thereby significantly improving productivity, and the liquid drug may be simultaneously extracted from the plurality of vials, thereby rapidly and easily performing a liquid drug extraction work.

What is claimed is:

1. A multi-vial adapter comprising:

an adapter body including at least two body parts which are connected to each other at a certain angle, a head part which protrudes upward from a connection portion between the body parts, and at least two spike parts which extend downward from the body parts, respectively, at positions spaced apart from the connection portion at a predetermined distance; and at least two adapter caps which are physically fastened and fixed to the body parts, respectively while allowing the spike parts to pass therethrough, respectively, wherein the adapter body is configured such that the body parts, the head part, and the spike parts are integrally formed through injection molding, and is formed therein with a liquid drug flow path that guides movement of a liquid drug from the respective spike parts to the head part via the respective body parts, wherein the liquid drug flow path includes:

via channels extending along an inside of the respective body parts, and having one ends connected to each other and opposite ends that are open;

an inflow channel extending along an inside of each of the spike parts, and having a lower end that is open and an upper end communicating with each of the via channels;

an outflow channel formed inside the head part, and having an upper end that is open and a lower end communicating with the via channel; and a channel closer fixedly coupled to the opposite end of the via channel to close the open opposite end of the via channel, thereby forming a closed path extending from the open lower end of the inflow channel to the open opposite end of the via channel.

2. The multi-vial adapter of claim 1, wherein each of the body parts is further formed with an end pipe having an open end portion and extending at a predetermined length with an inner diameter that is expanded from the opposite end of the via channel, the inside of each of the spike parts is further formed with a ventilation channel extending parallel to the inflow channel and having an open lower end and an upper end communicating with the end pipe, and a filter member is fixedly coupled to the end pipe.

3. The multi-vial adapter of claim 1, wherein the opposite end of the via channel is formed with a mounting step having an inner diameter that is relatively larger than an inner diameter of the via channel, and the channel closer includes an airtight body mounted on the mounting step while being inserted into the mounting step, and an insertion head formed on a front surface of the airtight body to enter an inside of the via channel at a predetermined depth.

4. The multi-vial adapter of claim 1, wherein a bottom surface of the body part is formed with an annular-shaped docking body around the spike part, and an upper end of the adapter cap is formed with a connection pipe into which the docking body is inserted, and the docking body includes four docking segments divided radially at 90-degree intervals about the spike part, in which a pair of docking segments facing each other among the four docking segments are formed with a latch protrusion and an inward slope part, an inner circumferential surface of the connection pipe is formed with a protrusion slope part protruding obliquely toward a center, and a pair of latch openings are formed at a lower side of the protrusion slope part at positions facing each other such that the latch protrusion is latched thereto.

* * * * *